United States Patent
Tsai

[19]

[11] Patent Number: 5,774,295
[45] Date of Patent: Jun. 30, 1998

[54] SERVO TRACK WRITING TECHNIQUE

[75] Inventor: John C. Tsai, Saratoga, Calif.

[73] Assignee: Excel Precision, Inc., Santa Clara, Calif.

[21] Appl. No.: 818,330

[22] Filed: Mar. 14, 1997

[51] Int. Cl.$^6$ .................................................. G11B 5/596
[52] U.S. Cl. ..................... 360/77.03; 360/75; 360/78.11
[58] Field of Search ................................... 360/77.03, 75, 360/77.02, 78.11, 78.04; 369/44.32

[56] References Cited

U.S. PATENT DOCUMENTS

| | | | |
|---|---|---|---|
| 5,162,955 | 11/1992 | Burdenko | 360/77.03 |
| 5,227,625 | 7/1993 | Hetzler | 360/77.03 |
| 5,315,372 | 5/1994 | Tsai | 360/77.03 |

*Primary Examiner*—Thang V. Tran
*Attorney, Agent, or Firm*—Raymond E. Roberts; Michael J. Hughes

[57] ABSTRACT

A servotrack writing apparatus (10) having a reference section (30), a workpiece section (32), and a tracking section (34). With the reference section (30) a standard is established without a disk drive workpiece (12) mounted. A workpiece (12) is then mounted in the workpiece section (32) with a beamsplitter-reflector unit (52) attached to the actuator arm (20) bearing the read-write head (18) which is to be used for servotrack writing, and verification information is obtained for comparison with the standard. Based upon this comparison, correction of workpiece (12) mounting offset and eccentricity of beamsplitter-reflector unit (52) mounting may then be performed before servotracks are written, or compensation for such offset and eccentricity may be performed while servotracks are written. The tracking section (34) operates using closed-loop feedback to slave the actuator arm (20) of the workpiece (12) to a tracking arm (62) and then may use a laser interferometer (70) to precisely measure location of a tracking retro-reflector (68) mounted on the tracking arm (62), thereby permitting very accurate and controlled positioning of the synchronized read-write head (18) while servotrack writing is carried out.

18 Claims, 5 Drawing Sheets

SERVO TRACK WRITING TECHNIQUE

TECHNICAL FIELD

The present invention relates generally to the fields of laser interferometric and general optical measurements, and more particularly to an improved device and method for accurately positioning read-write heads for servotrack writing during the manufacture of dynamic magnetic information storage and retrieval devices commonly known as computer hard disks.

BACKGROUND ART

A particularly critical step during the manufacture and assembly of computer hard disk drives is servotrack writing, the writing of servotracks onto the storage media which are later used during the operation of such drives for positional referencing when reading and writing user data. To obtain very high storage density in disk drives, very closely written and accurately located servotracks are needed. Today the disk drive industry has achieved 7,000 tracks per inch ("tpi") in typical manufacturing settings, and up to 10,000 tpi in laboratory settings. Unfortunately, progressing to 10,000 tpi in manufacturing now, and reaching 20,000 tpi within the next two years, are proving to be quite difficult goals to achieve.

Manufacturers of servotrack writing equipment face two key problems in reaching these goals in manufacturing environments. (Laboratory environments are ignored here, although those skilled in the art will readily appreciate that the inventor's techniques have applicability there as well.) The first problem is offset of disk drives relative to servotrack writing apparatus (i.e., repeatability of workpiece mounting). The second problem is offset of mounting of measurement targets used during servotrack writing on the disk drives (i.e., repeatability of target mounting; often termed a problem of mounting eccentricity). And, of course, both of these problems may exist in varying degrees in combination.

Due to the need for high measurement precision, the disk drive industry has long used feedback closed-loop techniques to position read/write heads when performing servotrack writing. And due to the small size of the read/write heads used in disk drives, measurements in such techniques usually cannot be made directly at the heads themselves, but rather must be made at locations from which the position of the heads can then be inferred. For example, somewhere on the mechanism used to move the read/write heads.

A common early closed-loop feedback servotrack writing technique uses mechanical push-pins. In this technique the actuator arms upon which the read/write heads in a disk drive are mounted have a thru-hole provided. During servowriting a push-pin on a servowriter arm is inserted into the thru-hole and used to 1) physically push the actuator arm where desired or 2) follow where the actuator arm goes (or even a combination where the push-pin is used to push against actuator system counter tension, to reduce affects of push-pin to thru-hole mechanical play). Closed-loop techniques are then used to measure the position of the servowriter arm, to infer the position of the actuator arm, and to control positioning as needed while the writing of servotracks is carried out. Such mechanical push-pin techniques were once so common that virtually all disk drive actuator arms made today still have thru-holes included in them.

Unfortunately, mechanical push-pin servotrack writing techniques have a number of disadvantages, which can generally be classed into two types. First, are manifestations of the Heisenberg uncertainty principle (i.e., that effort to measure affects that which is being measured). And the second is increased risk of physical damage due to dimensional constraints (e.g., push-pin damage to the media surface on the disk adjacent the actuator arm; this second problem is particularly exacerbated by the industry trend toward smaller disk drives).

Today optical closed-loop feedback techniques for servotrack writing are increasingly used. One example is the inventor's U.S. Pat. No. 5,315,372 (hereinafter Tsai '372), which teaches optical sensing of the thru-hole in an actuator arm of a workpiece disk drive, to lock a servotrack writer reference arm in synchronization with the actuator arm, then measuring the position of the reference arm to infer the position of the read/write head and to direct the workpiece disk drive where to place and maintain it during servotrack writing. Another example, one particularly notable because it does not rely upon the presence of a thru-hole, is U.S. Pat. No. 5,268,801 by Hazel (Hazel '801), which teaches placing a reflector on the moving assembly carrying the read/write heads in the disk drive workpiece, and then bouncing a light beam off of that reflector into a sensor, while using closed loop feedback to direct the positioning assembly of the workpiece to place the read/write head where desired. Both of these patents further serve to illustrate how refinement has occurred in optical servowriting techniques. Hazel '801 uses what can be termed a cantilevered reflection technique, directing a light beam at a substantial angle onto a reflective surface which moves in concert with the read/write head of a workpiece. The varying angle of incidence of the light beam into the movable reflector produces a similar varying angle of reflection onward to a sensor (which usually has to be a sensor array of appreciable size). In contrast, Tsai '372 uses laser interferometric measurement of the displacement of a retro-reflector mounted on a servotrack writer reference arm. Laser interferometric measurement techniques are capable of very high resolution, and are today overwhelmingly preferred in the industry.

DISCLOSURE OF INVENTION

Accordingly, it is an object of the present invention to provide a servotrack writing system capable of writing track densities above 8,000 tracks per inch (3,200 tracks per centimeter).

Another object of the invention is to provide a servotrack writing system having reduced degradation of writing accuracy due to workpiece mounting offset in the writing apparatus.

And, another object of the invention is to provide a servotrack writing system having reduced degradation of writing accuracy due to measurement apparatus target mounting eccentricity.

Briefly, a basic preferred embodiment of the present invention is a servotrack writing apparatus for writing servotracks in a computer disk drive using a read-write head mounted on a movable actuator assembly. The writing apparatus produces a light beam which is directed into a reference section optical target, when no workpiece is mounted in the writing apparatus. The light beam is reflected from the reference section optical target as a reference beam.

When a workpiece is mounted in the writing apparatus, the light beam is directed into a workpiece section optical target which is mounted upon the actuator assembly of the workpiece. A portion of the light beam is reflected from the workpiece section optical target as a verification beam.

The reference beam and the verification beam are respectively directed into a reference detector. A reference incidence position and a verification incidence position are detected and compared. From this comparison, information about mounting offset of the workpiece in the writing apparatus is calculated and may be applied to correcting any mounting offset before servotrack writing ensues, or to compensating for any mounting offset while servotrack writing is carried out. Also from this comparison, information about eccentricity of mounting of the workpiece section optical target upon the actuator assembly of the workpiece is calculated and may be applied to correcting any such mounting eccentricity before servotrack writing ensues, or to compensating for any such mounting eccentricity while servotrack writing is carried out.

Briefly, an enhanced preferred embodiment of the present invention includes the features of the basic preferred embodiment, discussed above, as well as the following. In addition to the portion of the light beam which is reflected from the workpiece section optical target and becomes the verification beam, another portion of the light beam is directed as a tracking beam onward into a tracking section detector which is mounted upon a tracking arm. A tracking incidence position is detected and is used by the writing apparatus to direct the workpiece to synchronize the position of the actuator assembly of the workpiece with this tracking arm.

This embodiment of the writing apparatus also includes a positioning subsystem, a measuring sub-system, and a tracking section optical target which is also mounted upon the tracking arm. The positioning sub-system is used to position the tracking arm as desired based upon feedback from the measuring sub-system about the actual location of the tracking section optical target. Since the actuator assembly of the workpiece is synchronized to the tracking section detector, which is also mounted on the tracking arm, the read-write head within the workpiece may be accurately positioned as desired while the workpiece is directed to write servotracks.

An advantage of the present invention is that it permits increased positioning resolution, and thus writing of servotracks at higher densities than are currently possible in manufacturing environments.

Another advantage of the invention is that it allows detection of disk drive workpiece mounting offset, and thus permits correction of such offset before servotracks are written, or compensation for such offset while servotracks are written, or of combinations of these.

Another advantage of the invention is that it allows detection of eccentric mounting of writing apparatus detection targets upon the workpiece, and thus permits correction of such eccentricity before servotracks are written, or compensation for such eccentricity while servotracks are written, or of combinations of these.

Another advantage of the invention is that it permits use of closed loop feedback control techniques to obtain very high accuracy. The read-write head of the workpiece may be slaved to a positionable section of the writing apparatus in one servo loop, and measurements and feedback controlled movement may then be used to direct the positioned section, thus also causing the synchronized read-write head to be positioned as desired for servotrack writing.

Another advantage of the invention is that it uses the control means of the workpiece itself to position the read-write head during servotrack writing, thus entirely eliminating mechanical play which has plagued many prior art writing systems. While the present invention does require mounting a detection target upon the actuator assembly of the workpiece, it includes verification to compensate for any introduced eccentricity. Similarly, while the present invention does require moving a positionable section, which the actuator assembly including the read-write head of the workpiece is synchronized to, the invention also includes verification of the location of that positioned section. In essence, all critical sections of the present invention are electrical, optical, or else are precisely verifiable by electrical and optical systems, in a manner which can be used for correction before servotracks are written, for compensation while servotracks are written, or even for combinations of these.

Another advantage of the invention is that it does not use a thru-hole in the actuator assembly of the workpiece, thus making thru-hole presence irrelevant and permitting use of the invention with a wider range of actuator assemblies (i.e., ones having as well as ones not having thru-holes).

Another advantage of the invention is that it does not use a push-pin for positioning within the workpiece, thus eliminating the possibility of any push-pin damage to sensitive workpiece components. Such push-pin damage has plagued many prior art writing systems, particularly as they are applied to smaller and mechanically more dense disk drives, as are today increasingly preferred by consumers.

Another advantage of the invention is that it may use small sensor assemblies, and more compact or overlaid optical paths, thus reducing writing apparatus size and complexity.

And, another advantage of the invention is that it may employ optical methods which are inherently highly accurate for all position detecting and measuring operations. Relatively conventional interferometric techniques may be used. These include dual frequency methods to obtain enhanced resolution, and differential methods which null out some error types and also contribute to enhanced resolution. Relatively conventional polarization techniques may also be used, to make efficient and accurate use of optical resources used in the invention. Both of these classes of conventional techniques are already widely used in the disk drive industry, and are accordingly well understood. It therefore follows the present invention may be easily and rapidly introduced to the industry.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

A preferred embodiment of the present invention is a servotrack writing apparatus. As illustrated in the various drawings herein, and particularly in the view of FIG. 1, a form of this preferred embodiment of the invention is depicted by the general reference character 10. Further, the present invention operates upon a generally conventional computer disk drive workpiece, which is depicted by the general reference character 12.

Figure 1:
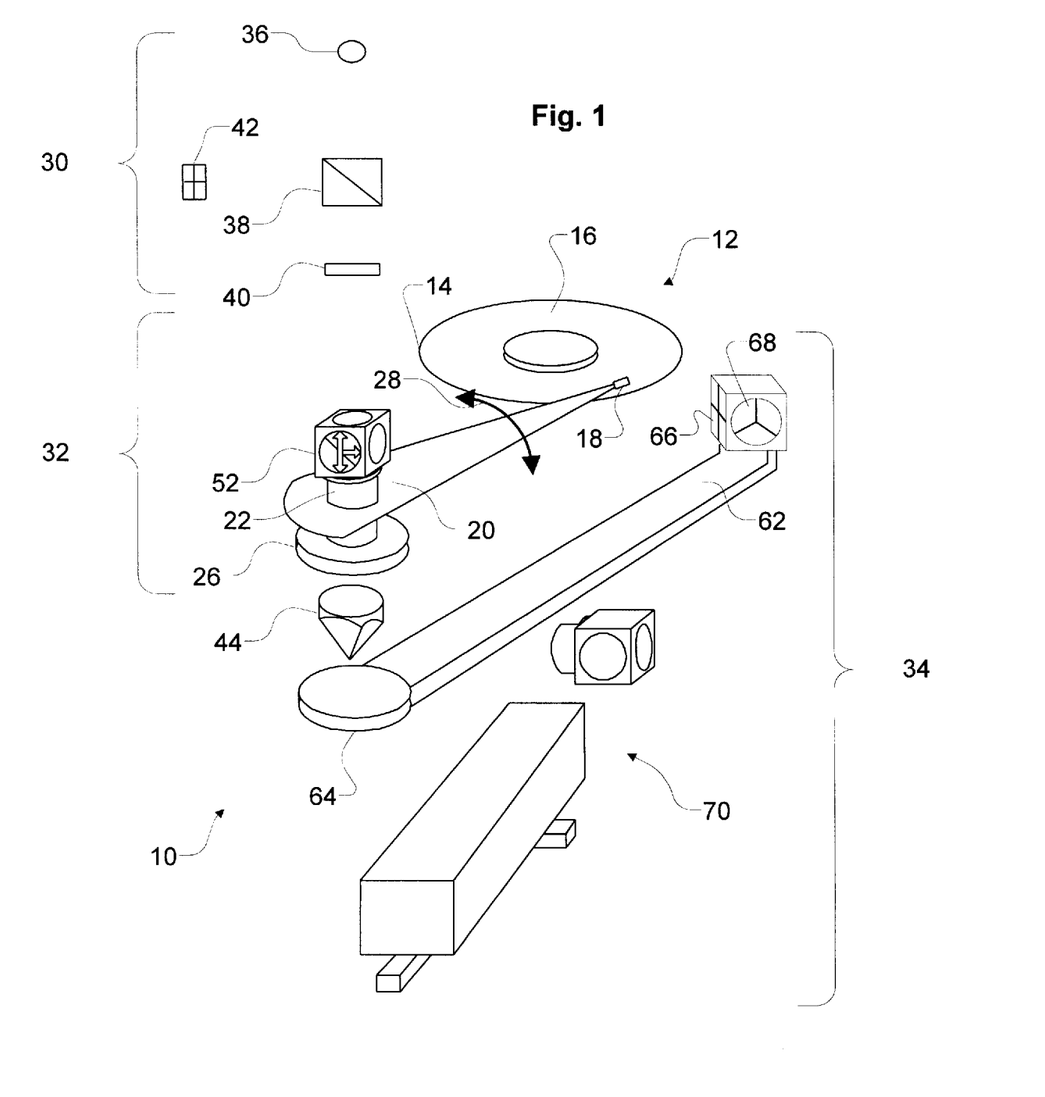
FIG. 1 is a stylized perspective view of the pertinent major components of the inventive writing apparatus and a workpiece disk drive.

For discussion, the pertinent components of the inventive writing apparatus 10 can be referred to as being generally located in a reference section 30, a workpiece section 32, and a tracking section 34. FIG. 1 presents in a perspective view the pertinent major physical components of the writing apparatus 10, and all of these sections in combination.

The workpiece 12 is shown in the figures without a housing or other non-pertinent components, to facilitate presentation of those components which work with the present invention. Included in the workpiece 12 is a rotatable disk platter 14 having thereon a media surface 16. To read and write upon the media surface 16 a read/write head 18 is used which is mounted on an actuator arm 20 that pivotally moves on an actuator shaft 22 under control of an actuator 26 (e.g., a Voice Coil Motor or similar means). During assembly of the workpiece 12 servotracks are written onto the media surface 16 for later use in the writing and reading of datatracks containing actual user data. The servotracks and datatracks themselves are not shown in the figures since they are quite small and closely spaced, and are not humanly visible. For simplicity and clarity of presentation, the figures used herein depict a workpiece 12 having a minimal number of disk platters 14, media surfaces 16, read/write heads 18, and actuator arms 20. Those skilled in the art will readily recognize that the inventive writing apparatus 10 is able to operate on workpieces 12 having multiples of such components.

The reference section 30 includes a light source 36 (e.g., a laser diode), a polarized reference beamsplitter 38, a half-wave plate 40, a reference detector 42, and a reference retro-reflector 44 (appearing below the rest of the components in the reference section 30 and the workpiece section 32 in FIG. 1).

Figure 2:
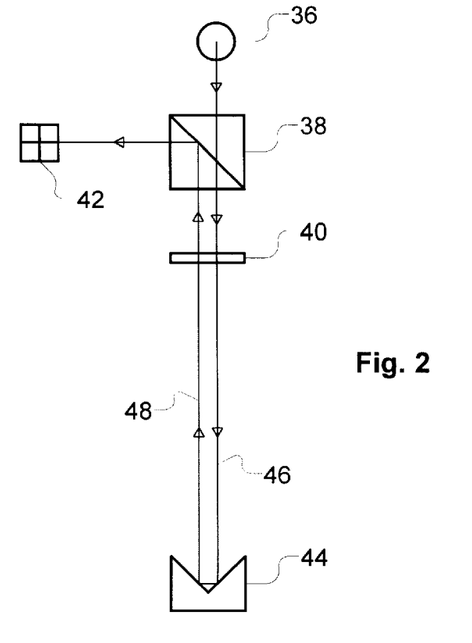
FIG. 2 is a side plan illustration of the active optical components and their operation when no workpiece is mounted in the inventive writing apparatus.
Figure 3:
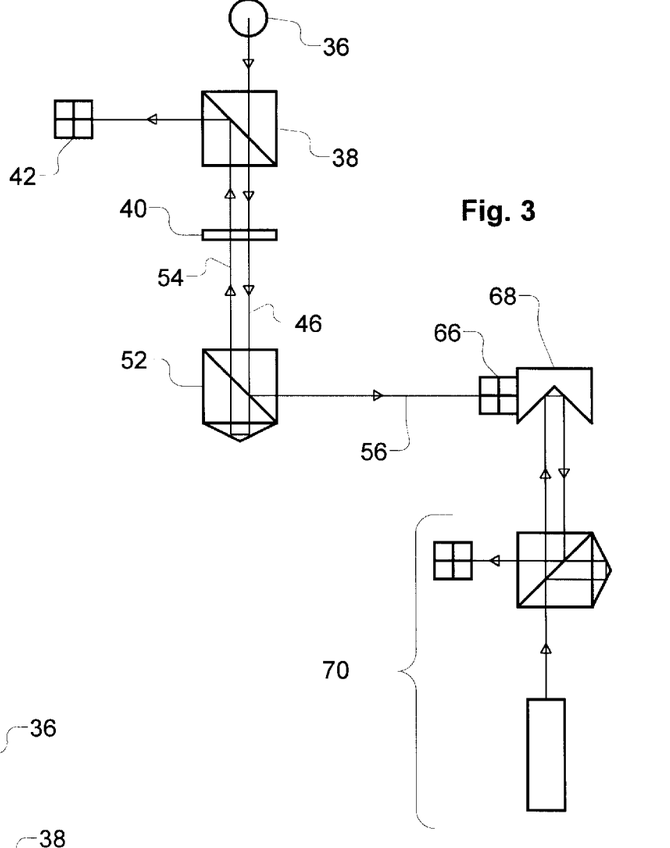
FIG. 3 is side plan illustration of the active optical components and their operation when a workpiece is mounted in the inventive writing apparatus.

FIG. 2 and FIG. 3 depict the optical operation of the writing apparatus 10, respectively with and without a workpiece 12 mounted. The light source 36 produces a light beam 46 which due to its initial polarization enters and passes through the reference beamsplitter 38 and the half-wave plate 40.

When no workpiece 12 is mounted (FIG. 2), the light beam 46 travels to the reference retro-reflector 44 and is reflected back from it as a reference beam 48. The reference beam 48 then passes (back) through the half-wave plate 40 and into the reference beamsplitter 38. Having now passed through the half-wave plate 40 twice, the reference beam 48 is now polarized such that, rather than passing through the reference beamsplitter 38, it is reflected and directed into the reference detector 42, where its position is measured and noted as a reference measurement 50 (not shown, however the use is discussed with FIG. 4–5).

To perform servotrack writing, a workpiece 12 is mounted (FIG. 3) in the writing apparatus 10 and a workpiece beamsplitter-reflector unit 52 is mounted on the workpiece 12 at the actuator shaft 22. The actuator arm 20 of the workpiece 12 is then directed to one extreme along its possible pivotal arc of travel (depicted with an arrowed arc line 28 in FIG. 1) and the light beam 46 of the writing apparatus 10 is again directed through the reference beamsplitter 38 and the half-wave plate 40. However, the light beam 46 now encounters the workpiece beamsplitter-reflector unit 52, where due to its polarization it is broken into two portions: a verification beam 54 and a tracking beam 56.

The verification beam 54 is reflected from the workpiece beamsplitter-reflector unit 52 back through the half-wave plate 40 and into the reference beamsplitter 38. Having now also passed through the half-wave plate 40 twice, the verification beam 54 is now polarized such that, rather than passing through the reference beamsplitter 38, it is reflected and from there directed into the reference detector 42 where its position is measured and noted as a first verification measurement 58 (not shown, however, the use is discussed with FIG. 4–5). The actuator arm 20 of the workpiece 12 is then directed to the opposite extreme along its pivotal arc of travel and a second verification measurement 60 (again not shown, but also discussed with FIG. 4–5) is similarly made.

Figure 4:
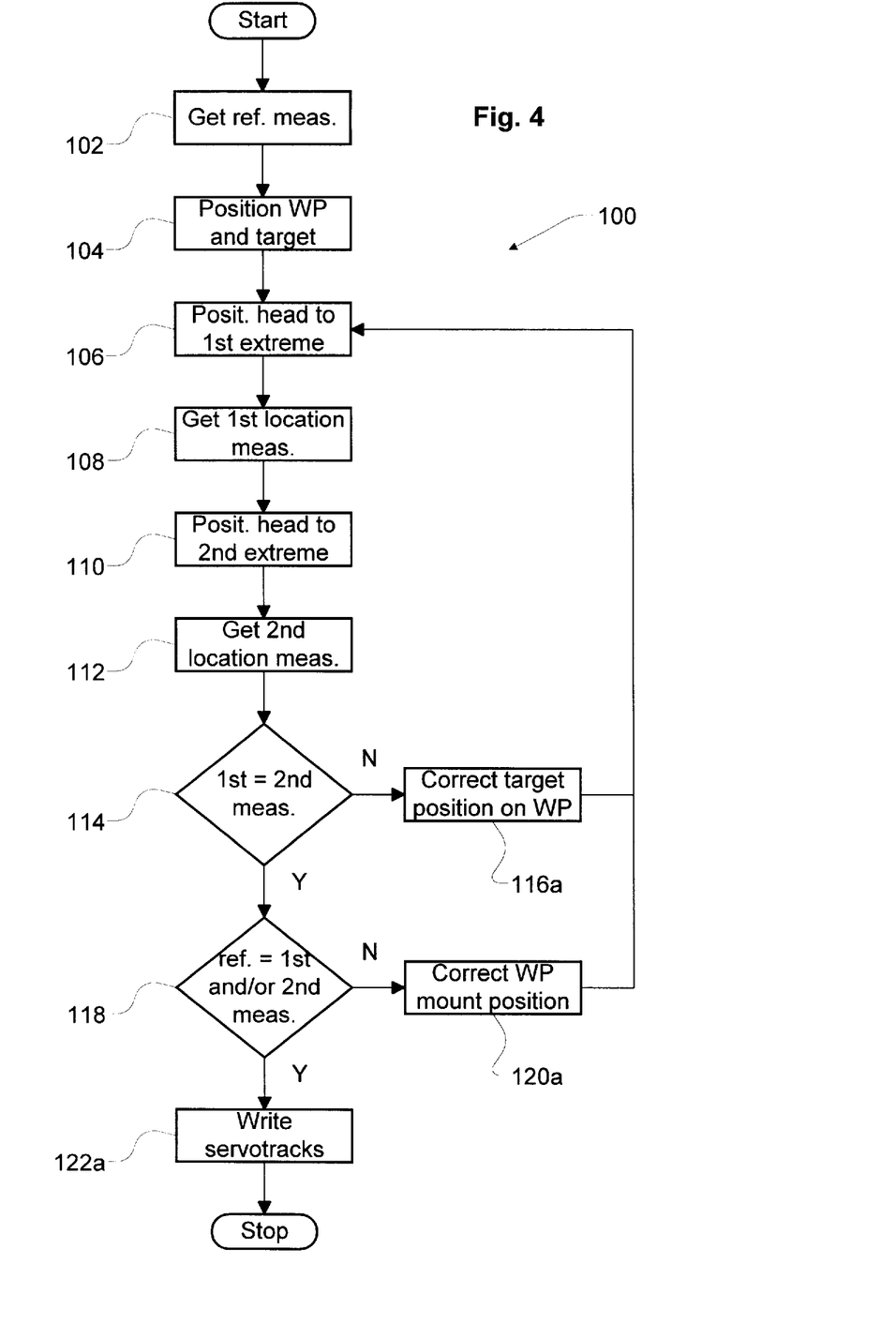
FIG. 4 is a flowchart of a set-up and writing process using the present invention to perform alignment corrections before actual servotrack writing.

FIG. 4 is a flow chart of a general servotrack writing process 100 using the present invention. At step 102, the reference measurement 50 is obtained (with no workpiece 12 yet mounted in the writing apparatus 10). At step 104 the workpiece 12 is placed into the writing apparatus 10 and the workpiece beamsplitter-reflector unit 52 is mounted onto the actuator shaft 22 of the workpiece 12 (the order of these two sub-operations is irrelevant). At step 106 the read/write head 18 of the workpiece 12 is moved to a first extreme along its range of motion, and at step 108 the first verification measurement 58 is obtained. At step 110 the read/write head 18 is moved to the second (i.e., opposite) extreme along its range of motion, and at step 112 the second verification measurement 60 is obtained. In step 114 the first verification measurement 58, and the second verification measurement 60 are compared. If the first verification measurement 58 and the second verification measurement 60 are not acceptably close in value, the workpiece beamsplitter-reflector unit 52 is considered to be offset from its optimal position (i.e., measurement target eccentricity exists), and step 116a performs workpiece beamsplitter-reflector unit 52 positional correction, after which the process returns to step 106 to confirm this correction (this loop may be repeated as often as needed). Once satisfactory results are obtained at step 114, the reference measurement 50 is compared to either the first verification measurement 58, the second verification measurement 60, or both (e.g., using a calculated average) at step 118. If the reference measurement 50 is found to differ by an unacceptable amount the workpiece 12 is considered to be offset from its optimal mounting position, and step 120a is performed to obtain workpiece 12 positional correction, and the process returns to step 106 to confirm this correction (this loop may also be repeated as often as needed). Once satisfactory results are obtained at step 118, the actual writing of servotracks is performed in step 122a (discussed in detail in FIG. 6).

Figure 5:
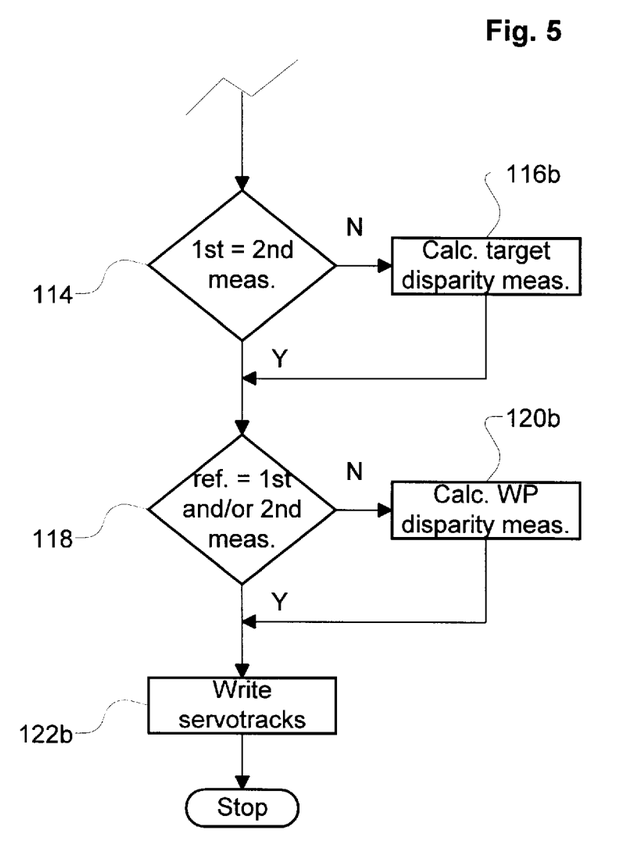
FIG. 5 is a partial flowchart of the process of FIG. 4, modified to perform measurement compensation during actual servotrack writing.

FIG. 5 portrays a variation of the process of FIG. 4, one which uses mathematical compensation for misalignments, rather than positional correction of workpiece 12 or workpiece beamsplitter-reflector unit 52 mounting. (Since they remain the same, step 102 through step 112 are not shown in FIG. 5.) Using this variation, when eccentricity of the workpiece beamsplitter-reflector unit 52 (i.e., the measurement target) is detected at step 114, an alternate step 116b is used to note a target disparity measurement 72 (not shown), and step 118 is directly proceeded to. Similarly, if mounting offset of the workpiece 12 is detected at step 118, an alternate step 120b is used to note a workpiece disparity measurement 74 (also not shown), and step 122b is directly proceeded to. Unlike step 122a of FIG. 4, step 122b includes calculation of measurement compensation based upon either one or both (as needed) of the target disparity measurement 72 and the workpiece disparity measurement 74. Those skilled in the art will readily recognize that combinations and slight variations of the processes depicted in FIG. 4–5 are easily possible, and are encompassed within the true spirit of the present invention. For example, for more radical cases of eccentricity or mounting offset, correction may be used, and for less radical situations, compensation may be applied.

In typical workpiece 12 manufacturing scenarios, mounting of the workpiece beamsplitter-reflector unit 52 on the workpiece 12, and mounting of the workpiece 12 itself into the writing apparatus 10 will be only temporary for the purposes of servotrack writing. These, as well as variation in (or out of) production tolerances, can introduce alignment variations between respective workpieces 12 which adversely affect overall measurement accuracy and repeatability. Some key benefits of the writing apparatus 10 are that it permits correction and compensation of such alignment variations, in the above described manners.

Returning to FIG. 1, the major physical components of the tracking section 34 include a tracking arm 62 which is controllably movable by a tracking positioner 64 (e.g., a Voice Coil Motor or other means). Mounted on the tracking arm 62 are a tracking detector 66 and a tracking retro-reflector 68. The tracking section 34 also includes a laser interferometer 70.

FIG. 3 depicts the optical operation of the writing apparatus 10 when a workpiece 12 is mounted. When the light source 36 of the writing apparatus 10 is suitably engaged to produce the tracking beam 56 at the mounted workpiece beamsplitter-reflector unit 52, the tracking beam 56 travels to the tracking detector 66, where it is used to determine whether the tracking arm 62 and the actuator arm 20 are truly synchronized, and if not to correct any discrepancy by closed-loop feedback control of the actuator 26 to move the actuator arm 20 of the workpiece 12 as needed (i.e., the actuator arm 20 is slaved to the tracking arm 62 of the writing apparatus 10). Once the actuator arm 20 and the tracking arm 62 is locked into synchronization in this manner the laser interferometer 70 is used to obtain displacement measurements of the tracking retro-reflector 68, so that the writing apparatus 10 can further use closed-loop feedback methods to precisely position the read/write head 18 within the workpiece 12 while servotrack writing is performed.

In the preferred embodiment, initial locking of synchronization is achieved by placing the tracking arm 62 at an expected midrange location, and slowly pivoting the actuator arm 20 across its range of motion. This causes the tracking beam 56 to be scanned onto the tracking detector 66 at some point, and the relatively slow rate of motion permits control of the actuator 26 of the workpiece 12 to accelerate the actuator arm 20 and lock it into synchronization with the tracking arm 62.

It should be noted that the actuator arm 20 and the tracking arm 62 may have quite different shapes (e.g., lengths) and that they do not necessarily need to be aligned in parallel, as is shown in the FIG. 1. The actuator arm 20 and the tracking arm 62 merely need to maintain proportional change in rotation (e.g., typically, that one degree of rotational change of the actuator arm 20 will be slavishly followed by exactly one degree of rotational change by the tracking arm 62, regardless of whether the actuator arm 20 and the tracking arm 62 are parallel, perpendicular, or in some other orientation). This permits considerable variation in constructing the writing apparatus 10, and also permits a range across which the actual angular mounting orientation of the workpiece beamsplitter-reflector unit 52 onto the workpiece 12 is irrelevant.

Figure 6:
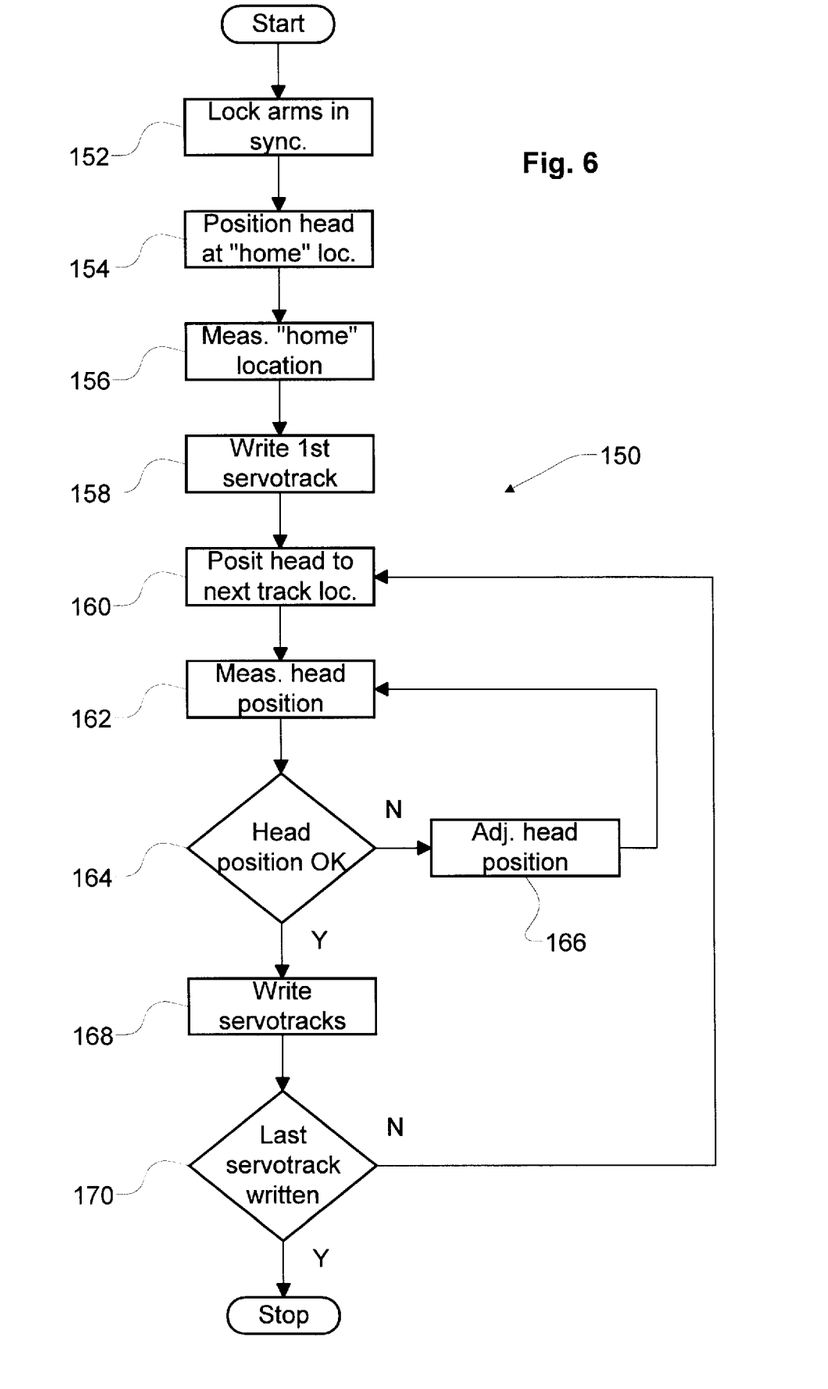
FIG. 6 is a flow chart illustrating a detailed servotrack writing process using the present invention, as would be performed as part of those processes depicted in FIG. 4 and FIG. 5.

FIG. 6 is a flowchart of a typical detailed servotrack writing process 150 using the present invention (i.e., of sub-operations in step 122a of FIG. 4 or in step 122b of FIG. 5). At step 152 the actuator arm 20 of the workpiece 12 and the tracking arm 62 of the writing apparatus 10 are locked into the synchronized closed loop relationship discussed above. At step 154 the actuator arm 20 is directed to a desired position for writing a first servotrack (i.e., a "home position"). Since displacement interferometry cannot determine absolute positions (only relative displacements), the tracking arm 62 is positioned (and with it the synchronized actuator arm 20) to what will become the first servotrack position (typically at an inner or outermost track on the media surface 16). At step 156 the laser interferometer 70 is used to note the position of the tracking retro-reflector 68 (e.g., by the conventional displacement interferometry operations of resetting an interference fringe count and noting an interference phase relationship). The first servotrack is then written at step 158. At step 160 the next desired servotrack location is positioned to. At step 162 the laser interferometer 70 is used to measure the new actuator arm 20 position (e.g., by using changes in the fringe count and phase relationship caused by the changing displacement in the location of the tracking retro-reflector 68). At step 164 acceptability of the actuator arm 20 position is determined (the "raw" displacement measurement from step 162 can be refined here if a compensating process is used, such as that in FIG. 5). If the position of the tracking arm 62 (and by inference also of the actuator arm 20) is unacceptable, a position adjustment is directed at step 166, and the process returns to step 162. Or, if the position is acceptable, a servotrack is written at step 168. At step 170 a decision is made whether the last servotrack has been written. If so, the process terminates. If not, the process returns to step 160 and proceeds with writing of the next servotrack. Those skilled in the art will recognize that considerable variation in the detailed servotrack writing process 150 described above is possible.

In addition to the above mentioned example, various other modifications and alterations of the writing apparatus 10, the general servotrack writing process 100, and the detailed servotrack writing process 150 may all easily be made. Accordingly, the above disclosure is not to be considered as limiting and the appended claims are to be interpreted as encompassing the true spirit and the entire scope of the invention.

INDUSTRIAL APPLICABILITY

The present inventive servotrack writing apparatus 10, the general servotrack writing process 100, and the detailed servotrack writing process 150 are well suited for application in manufacturing of computer disk drives. Use of the invention permits writing of more closely spaced servotracks, and thus production of new disk drive types having higher storage density. Further, use of the invention permits more accurate set-up of servotrack writing and more accurate servotrack writing, and thus more economical production of existing disk drive types.

As with many manufacturing process, dimensional variations in the workpiece and components thereof must be expected. Further, assembly of such workpieces must be carried out at high production speeds, where mounting variations of both the workpiece in test fixtures and of tester components upon the workpiece can occur. The present invention permits either accommodation or correction of such variations, thereby permitting the above noted more economical production and higher quality production of computer disk drives.

The invention uses principles of mechanics, electronics, and optics which are well understood in the computer disk drive industry. Rapid and wide acceptance can therefore be anticipated as the invention is applied in new production facilities, and minimal change and disruption are to be expected when the invention is used to upgrade existing production facilities.

Implementations of the invention are easily assembled using presently available materials and means. While some precision optical and laser components are required, they are of relatively common and available types in the servotrack writer industry. The other components of the invention are quite common, widely available, and inexpensive. It can therefore be expected that relatively little additional burden will be imposed upon the industry, in exchange for the considerable benefit which the invention provides.

For the above, and other, reasons, it is expected that the servotrack writing apparatus 10, the general servotrack writing process 100, and the detailed servotrack writing process 150 of the present invention will have widespread industrial applicability. Therefore, it is expected that the commercial utility of the present invention will be extensive and long lasting.

I claim:

1. A servotrack writing apparatus, for writing servotracks in a computer disk drive workpiece having a read-write head mounted on a movable actuator assembly, the writing apparatus comprising:
    a light source which produces a light beam;
    reference optical target means, for receiving said light beam when the workpiece is not mounted in the writing apparatus, and for redirecting said light beam as a reference beam; and
    workpiece optical target means which is mounted on the actuator assembly of the workpiece, for receiving said light beam when the workpiece is mounted in the writing apparatus and redirecting a first portion of said light beam as a verification beam and redirecting a second portion of said light beam as a tracking beam;
    common optical means, for directing said reference beam and said verification beam; and
    a reference detector, for detecting said reference beam when the workpiece is not mounted in the writing apparatus, thereby permitting calculation of a reference incidence position, and for detecting said verification beam when the workpiece is mounted in the writing apparatus, thereby permitting calculation of a verification incidence position for comparison with said reference incidence position, to derive mounting deviation information about the workpiece which is usable to correct mounting of the workpiece and to compensate measurements made based upon location of the workpiece;
    a tracking detector, for detecting said tracking beam and thereby permitting the writing apparatus to direct the workpiece such that position and movement of the actuator assembly of the workpiece are synchronized with said tracking detector;
    tracking optical target means which is mounted in fixed relationship with said tracking detector;
    measuring means, for determining location of said tracking optical target means, and thereby inferring location of said tracking detector; and
    positioning means, for positioning said tracking detector and said tracking optical target means, thereby permitting the writing apparatus to position the tracking detector as desired, based upon feedback from the measuring means of position of the tracking optical target means, and to thereby place the synchronized actuator assembly bearing the read-write head within the workpiece while servotracks are written.

2. The writing apparatus of claim 1, wherein:
    said light source is a laser diode.

3. The writing apparatus of claim 1, wherein:
    said reference detector and said tracking detector are members of the set consisting of photo sensitive devices, photo diode arrays, and charge coupled devices.

4. The writing apparatus of claim 1, wherein:
    said reference optical target means is a retro-reflector.

5. The writing apparatus of claim 1, wherein:
    said workpiece optical target means includes a beamsplitter and a retro-reflector.

6. The writing apparatus of claim 1, wherein:
    said measuring means is a laser interferometer system; and
    said tracking optical target means is a retro-reflector.

7. The writing apparatus of claim 6, wherein:
    said laser interferometer system uses multiple frequency interferometric techniques, to enhance resolution.

8. The writing apparatus of claim 6, wherein:
    said laser interferometer system uses differential techniques, to null errors and enhance resolution.

9. The writing apparatus of claim 1, wherein:
    said common optical means and said workpiece optical target means both operate in polarization dependent manners; and
    said light beam is suitably initially polarized to substantially pass through said common optical means; and the writing apparatus further includes:
        polarizing means suitably optically mounted to receive said light beam, said reference beam, and said verification beam; wherein
        said light beam is suitably polarized to substantially be redirected by said reference optical target means as said reference beam when the workpiece is not mounted in the writing apparatus, and said first portion of the light beam is suitably polarized to substantially be redirected by said workpiece optical target means as said verification beam when the workpiece is mounted in the writing apparatus; and
        said reference beam and said verification beam are suitably polarized to substantially be directed by said common optical means into said reference detector.

10. An improved servotrack writing apparatus of the type in which a computer disk drive workpiece is temporarily mounted for writing servotracks using a read-write head mounted on a movable actuator assembly of the workpiece, the improvement comprising:

a light source, for producing a light beam;

reference optical target means, for receiving said light beam when the workpiece is not mounted in the writing apparatus, and for redirecting said light beam as a reference beam;

workpiece optical target means which is mounted on the actuator assembly of the workpiece, for receiving said light beam when the workpiece is mounted in the writing apparatus, and for redirecting said light beam as a verification beam;

common optical means, for directing said reference beam and said verification beam; and a reference detector, for detecting said reference beam when the workpiece is not mounted in the writing apparatus, thereby permitting calculation of a reference incidence position, and for detecting said verification beam when the workpiece is mounted in the writing apparatus, thereby permitting calculation of a verification incidence position for comparison with said reference incidence position, to derive mounting deviation information about the workpiece which is usable to correct mounting of the workpiece and to compensate measurements made based upon location of the workpiece.

11. The writing apparatus of claim 10, wherein:

said workpiece optical target means receives said light beam when the workpiece is mounted in the writing apparatus, and redirects a first portion of said light beam as said verification beam, and redirects a second portion of said light beam as a tracking beam; and the writing apparatus further including:

a tracking detector, for detecting said tracking beam and thereby permitting the writing apparatus to direct the workpiece such that position and movement of the actuator assembly of the workpiece are synchronized with said tracking detector;

tracking optical target means which is mounted in fixed relationship with said tracking detector;

measuring means, for determining location of said tracking optical target means, and thereby inferring location of said tracking detector; and positioning means, for positioning said tracking detector and said tracking optical target means, thereby permitting the writing apparatus to position the tracking detector as desired, based upon feedback from the measuring means of position of the tracking optical target means, and to thereby position the synchronized actuator assembly bearing the read-write head within the workpiece while the servotracks are written.

12. A servotrack writing process, to write servotracks in a computer disk drive workpieces having a read-write head mounted on a movable actuator assembly using a writing apparatus, the writing process comprising:

(a) detecting a reference incidence position by directing a light beam off of a reference target into a reference detector;

(b) mounting the workpiece in the writing apparatus with a workpiece target mounted on the actuator assembly;

(c) detecting a verification incidence position by directing a light beam off of said workpiece target into said reference detector;

(d) comparing said reference incidence position and said verification incidence position to derive a workpiece mounting deviation information and workpiece target mounting deviation information; and (e) writing the servotracks in the workpiece based upon said workpiece mounting deviation information and said workpiece target mounting deviation information.

13. The servotrack writing process of claim 12, wherein:

step c includes directing a first portion of said light beam as a verification beam into said reference detector, and directing a second portion of said light beam as a tracking beam; and step e of the writing process includes:

directing said tracking beam into a tracking detector, and thereby directing the workpiece such that position and movement of the actuator assembly of the workpiece are synchronized with said tracking detector;

measuring location of a tracking target which is mounted in fixed relationship with said tracking detector, thereby inferring location of said tracking detector; and positioning said tracking detector and said tracking target, thereby permitting the writing apparatus to position the tracking detector as desired based upon feedback of position of the tracking target, and to thereby position the synchronized actuator assembly bearing the read-write head within the workpiece while the servotracks are written.

14. The servotrack writing process of claim 12, wherein:

step e includes correcting mounting position of the workpiece in the writing apparatus based upon said workpiece mounting deviation information.

15. The servotrack writing process of claim 12, wherein:

step e includes correcting mounting position of the workpiece target on the actuator assembly of the workpiece based upon said workpiece target mounting deviation information.

16. The servotrack writing process of claim 12, wherein:

step e includes compensating for mounting misalignment of the workpiece in the writing apparatus based upon said workpiece mounting deviation information.

17. The servotrack writing process of claim 12, wherein:

step e includes compensating for mounting eccentricity of the workpiece target on the actuator assembly of the workpiece based upon said workpiece target mounting deviation information.

18. The servotrack writing process of claim 12, wherein:

positioning said read-write head of the workpiece at an innermost servotrack position and detecting an inner incidence position, in step c;

positioning said read-write head of the workpiece at an outermost servotrack position and detecting an outer incidence position, in step c; and combining said inner incidence position and said outer incidence position to thereby derive said workpiece target mounting deviation information, in step d.

* * * * *